Dec. 5, 1939.  P. F. SHARP ET AL  2,182,619
METHOD OF PREPARING BETA LACTOSE
Filed July 24, 1937
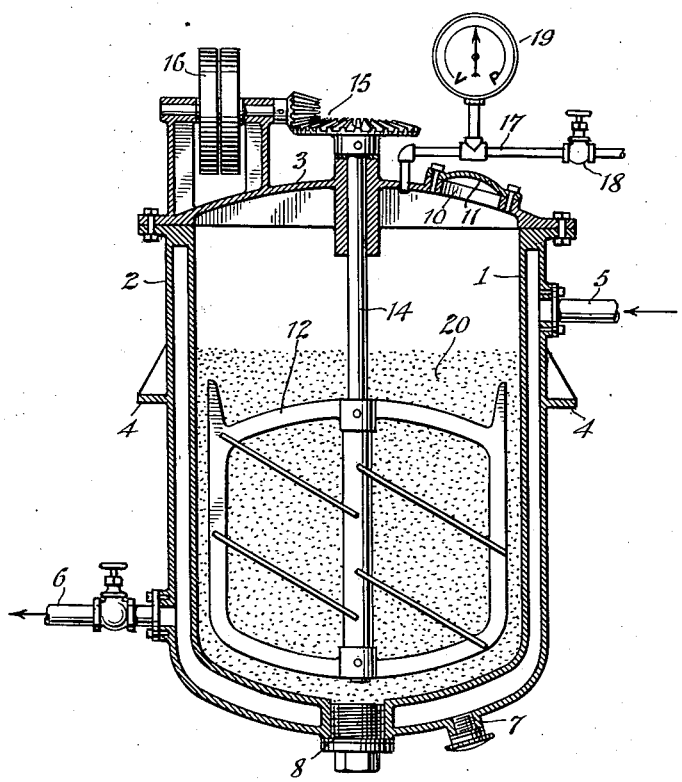
INVENTORS
Paul Francis Sharp
David Birney Hand
BY
Robert V. Morse ATTORNEY.

Patented Dec. 5, 1939

2,182,619

UNITED STATES PATENT OFFICE 2,182,619

METHOD OF PREPARING BETA LACTOSE

Paul Francis Sharp and David Birney Hand, Ithaca, N. Y., assignors to Cornell Research Foundation, Inc., Ithaca, N. Y., a corporation of New York Application July 24, 1937, Serial No. 155,475

5 Claims. (Cl. 127—31)

This invention relates to a method for producing beta lactose by a process that is considerably simpler and cheaper than those heretofore known. Lactose, more commonly called milk-sugar, ordinarily exists in two forms, known respectively as alpha lactose and beta lactose. The dry lactose of commerce consists of dry alpha lactose hydrate, and is of comparatively low solubility at ordinary temperatures. Beta lactose is of greater value than alpha lactose because beta lactose is very much more soluble than alpha lactose, has a sweeter taste, and is superior for many uses, as for example, it can be used in place of ordinary sucrose or cane sugar. Lactose produces desirable physiological effects not produced by sucrose. All forms of lactose apparently produce essentially the same beneficial physiological effects, but beta lactose is much easier to take, as the greater solubility of the beta form over the alpha enables larger quantities of beta lactose to be readily dissolved and assimilated. The sweeter taste of beta lactose is possibly due to its greater solubility.

In the prior patents of Paul Francis Sharp, No. 1,810,682 and No. 1,956,811, there are described methods by which lactose, in the more valuable beta form, is commercially produced. These have involved in general putting the alpha lactose into solution, crystallizing out beta lactose under certain conditions of temperature, and then separating the beta lactose crystals from the mother liquor. The handling of the viscous or doughy mass formed by alpha lactose and water, and the drawing off of the mother liquor, washing, and centrifuging to dry the beta crystals, are steps that are improved upon or dispensed with by the present invention. In the present invention the materials are handled in a practically dry state, at least avoiding any doughy consistence, and the transition from alpha lactose to beta lactose is made simply and directly. This new method may be performed for example with an autoclave such as shown in the Patent No. 1,810,682, above mentioned, but it is used in a different way.

In the drawing forming part of this specification we have illustrated a form of autoclave suitable for use in carrying out our process. Any other suitable apparatus may be used and we do not claim any novelty for the apparatus shown in the drawing. The novelty resides in the contents put into the autoclave, and the way it is heated and treated to accomplish the result. The autoclave consists of a container 1 surrounded by a jacket 2 and closed by a cover 3, the whole being mounted or suspended on lugs 4. A pipe 5 is provided to introduce steam or other heating medium into the jacket 2, so as to heat the container 1, and a second valved pipe 6 permits the steam or other heating fluid to pass on through. A drain plug 7 is provided for the jacket 2, and a drain plug 8 is provided for the container 1. The cover 3 also has an aperture 10, which can be closed by the supplementary cover 11. The cover 11 may be used as a vent, but it is preferable to use a valve such as 18, which can be more easily controlled. A stirrer 12 is mounted on the shaft 14 and driven through the gearing 15 by any suitable means such as the belt pulleys 16. The interior of the container 1 is tapped by a pipe line 17 having regulating valve 18 by which the flow of air or steam can be controlled. A gauge 19, preferably of the combined pressure-vacuum type, is also provided, and the temperature can be read by an ordinary thermometer. The reference numeral 20 indicates the lactose crystals to be described.

Under the present invention the process of making beta lactose is as follows: The container of the autoclave 1 is filled with a charge of dry alpha lactose hydrate (the ordinary lactose of commerce), and the autoclave is then closed. Steam or heat is applied to the outer jacket 2, the agitator 12 is started, and the contents of the autoclave is driven up to some temperature in the neighborhood of 120° to 130° C. The dry alpha lactose hydrate contains one molecule of water of crystallization, and at this high temperature the molecule of water is driven off; but since it cannot escape it is retained in the atmosphere of the autoclave and some of it condenses on the surface of the alpha lactose crystals, thereby forming a solution or producing a liquid phase intimately associated with the crystals. There is not enough water present at any one time to form any great amount of solution, so that caking and setting of the entire mass is prevented.

At this high temperature the solution formed on the surface of the crystals is very concentrated, and an equilibrium between the forms of lactose in the solution is soon attained. At this high temperature beta lactose is the least soluble of the forms of lactose present in the solution and consequently crystallizes out. This again sets free the small amount of water present, which then serves as a solvent for more alpha lactose. This process of solution of the alpha lactose continues until substantially all of the alpha lactose has gone into solution and has crystallized out as beta lactose. This transformation usually requires from thirty minutes to an hour. At the end of this time the valve 18 is opened and the water or steam allowed to slowly escape. From five to fifteen minutes are required to remove the water. The autoclave is then opened and the dry beta lactose is removed.

There may be a little localized caking, but substantially all the lactose at the time of opening the autoclave is in the form of powered beta lactose in the crystalline form. This process therefore gives a simple and direct method capable of transforming alpha lactose into beta lactose in a short period of time, and without the trouble of handling viscous solutions or excess water. It is substantially a dry process.

The operating conditions are subject to various modifications without departing from this invention. For example, the time for complete conversion depends upon the relation of the charge of alpha lactose hydrate to the total capacity of the autoclave, and on the size of the crystals, temperature, and rate of heating and agitation. Some of the water may be permitted to escape from the autoclave during the heating, but if too much water is allowed to escape early in the heating process complete conversion to beta lactose will not occur, or the time for conversion may be unduly prolonged. We have given temperature and time conditions for the conversion of the ordinary refined alpha lactose hydrate crystals of commerce. Other conditions of time and temperature can be used without departing from the invention, but if lower temperatures approaching the conversion temperature are used the time of conversion will be unduly prolonged, and if higher temperatures are used the product may be less desirable as a result of browning.

In order to minimize still further any slight tendency toward browning as a result of oxidation, care may be taken to evacuate air remaining in the container after it is filled and sealed. One simple way of doing this is to allow the valved vent 18 to remain open until the temperature of the contents of the autoclave exceeds 100° C., or until the alpha lactose hydrate begins to give off some of its moisture. The expansion of the heated air will tend to force it out, and it will also be blown out with the steam. Care should be taken not to lose too much steam, as the water is necessary to carry on the conversion process described. The air may also be removed if desired by an ordinary vacuum pump, either before or after the contents of the container is heated. The vacuum pump must not be left on for too long a period, particularly at the higher temperatures; otherwise the water liberated or present will be removed and the conversion to beta lactose will not occur or will be incomplete or unduly prolonged.

It is advisable at the end of the conversion to allow the water to escape slowly from the autoclave through the valve-controlled vent 18. The water escapes in the form of vapor. This slow escape of water is desirable as it allows time for the lactose in the solution from which the water is removed to convert and crystallize out in the beta form.

We have described the process as starting with alpha lactose hydrate, but it is not necessarily restricted thereto, as other forms of lactose, or mixtures of lactoses, may be used, as for example the mixture of alpha and beta lactose obtained in some methods used for drying milk.

While it is generally desirable to convert as large a proportion of lactose into the beta form as possible, any smaller proportion may be obtained with our invention by discontinuing the process at an intermediate stage or by restricting the moisture content or temperatures, and any such partial or incomplete operation will be understood as falling within the scope of the present invention when such beta lactose as is produced results from the process herein described and claimed.

In the chemical literature of lactose the temperature at which beta lactose will crystallize out of solution instead of alpha lactose is termed the "transition point", and generally considered to be approximately 93° C. However, it is now known that the transition point varies considerably under different conditions, and is not necessarily limited to 93° C.

While we have in the foregoing described a certain specific example, it will be understood that it is for the purpose of illustration to make clear the principles of the invention, which is not limited to the particular form shown, but is susceptible to various modifications and adaptations in different installations, as will be apparent to those skilled in the art, without departing from the scope of the invention as stated in the following claims.

We claim:

1. The process of producing beta lactose crystals which consists in heating alpha lactose hydrate crystals at a sufficiently high temperature to drive off the water of crystallization, maintaining some of the water of crystallization so driven off in a moisture confining zone in intimate association with the crystals and maintaining the temperature above the transition point until the crystals are substantially transformed into beta lactose crystals, and then allowing the water to escape, so that dry beta lactose crystals remain.

2. The process of producing beta lactose crystals which consists in heating and agitating alpha lactose hydrate crystals at a sufficiently high temperature to drive off the water of crystallization, maintaining some of the water of crystallization so driven off in a moisture confining zone in intimate association with the crystals and maintaining the temperature above the transition point until the crystals are substantially transformed into beta lactose crystals, and then allowing the water to escape, so that dry beta lactose crystals remain.

3. The process of producing beta lactose which consists in heating any other form of lactose containing water while in a pulverulent condition, maintaining the temperature above the transition point in a moisture confining zone so that some of the driven off water of crystallization is maintained in intimate contact until the lactose is sufficiently converted to the beta form, and then allowing the moisture driven off by the heat to escape, leaving dry beta lactose.

4. The process of producing beta lactose which consists in heating any other form of lactose containing water while in a pulverulent condition, agitating the same and maintaining the temperature above the transition point in a moisture confining zone so that some of the driven off water of crystallization is maintained in intimate contact until the lactose is sufficiently converted to the beta form, and then allowing the moisture driven off by the heat to escape, leaving dry beta lactose.

5. The process of producing beta lactose which consists in heating and agitating alpha lactose hydrate crystals in a pulverulent condition, maintaining the temperature above the transition point in a moisture confining zone so that some of the driven off water of crystallization is maintained in intimate contact until the alpha lactose hydrate crystals are converted into beta lactose crystals, the process occurring without sufficient moisture to cause the lactose to become doughy or lose its pulverulent condition, and then allowing the water driven off by the heat to escape, leaving dry beta lactose.

PAUL FRANCIS SHARP.
DAVID BIRNEY HAND.